(12) United States Patent
Li et al.

(10) Patent No.: US 12,185,034 B2
(45) Date of Patent: Dec. 31, 2024

(54) CONFIGURATION METHOD FOR PROJECTING APPARATUS AND PROJECTING APPARATUS

(71) Applicant: Coretronic Corporation, Hsin-Chu (TW)

(72) Inventors: Chen-Ming Li, Hsin-Chu (TW);
Chia-Yen Ou, Hsin-Chu (TW);
Chia-Keng Wu, Hsin-Chu (TW);
Chien-Chun Peng, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 3 days.

(21) Appl. No.: 18/156,404

(22) Filed: Jan. 19, 2023

(65) Prior Publication Data
US 2024/0251064 A1    Jul. 25, 2024

(51) Int. Cl.
*H04N 9/31* (2006.01)
(52) U.S. Cl.
CPC ................ *H04N 9/3194* (2013.01)
(58) Field of Classification Search
None
See application file for complete search history.

(56) References Cited

U.S. PATENT DOCUMENTS 10,080,002 B2    9/2018  Kasuga et al.
2017/0295349 A1*  10/2017  Kasuga ............... G06K 7/1095

FOREIGN PATENT DOCUMENTS

CN    207965897    10/2018
CN    107295319    5/2021

* cited by examiner

*Primary Examiner* — Samira Monshi
(74) *Attorney, Agent, or Firm* — JCIPRNET

(57) ABSTRACT

A configuration method for projecting apparatus and a projecting apparatus are provided. In the method, at least one first identification pattern is projected, where the first identification pattern records a first configuration data of a target projecting apparatus. A first captured image is obtained, where the first captured image captures the first identification pattern. The first configuration data of the target projecting apparatus is identified from the first captured image. At least one parameter of a projecting apparatus is configured according to the first configuration data. Therefore, the efficiency of configuring projecting apparatuses could be improved.

20 Claims, 15 Drawing Sheets

CONFIGURATION METHOD FOR PROJECTING APPARATUS AND PROJECTING APPARATUS

BACKGROUND

Technical Field

The disclosure relates to a projection technique, and particularly relates to a configuration method for projecting apparatus and a projecting apparatus.

Description of Related Art

There are two existing ways for configuring projectors with the same configuration file, carrying file by a flash drive and transmitting file via a network. For example, FIG. 1A to FIG. 1C are schematic diagrams of the existing configuring manners of a projector. Referring to FIG. 1A, the on-screen display (OSD) menu setting such as the display setting, color setting, or network setting is saved in a flash drive. Referring to FIG. 1B, the OSD menu setting is transmitted via a network. A computer may install an application for configuration, so that another projector loads the OSD menu setting from the flash drive or via the network and applies the OSD menu setting by the application.

Referring to FIG. 1C, regarding the aforementioned configuration by the application, the computer has to connect to the projector via the network. The conventional network setting way is that the first projector projects its network setting such as Internet Protocol (IP) address, and the computer connected to the first projector inputs or searches the IP address of the first projector on the application, so that the computer may further connect to the first projector. More projectors may be connected to the computer in the same way.

However, the aforementioned existing configuring manners are not convenient. For example, the OSD menu setting should be saved by the saving function first, and then the OSD menu setting could be applied. The connection should be established first, and then the configuration file could be transmitted. The IP address should be set in the OSD menu setting first, and the application or web-based control page could connect to the projector.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The disclosure is directed to a configuration method for projecting apparatus and a projecting apparatus, which are adapted to improve the efficiency of the configuration.

Other objects and advantages of the disclosure may be further illustrated by the technical features broadly embodied and described as follows.

In order to achieve one or a portion of or all of the objects or other objects, an embodiment of the disclosure provides a configuration method for projecting apparatus including the following steps. At least one first identification pattern is projected, where the first identification pattern records a first configuration data of a target projecting apparatus. A first captured image is obtained, where the first captured image captures the first identification pattern. The first configuration data of the target projecting apparatus is identified from the first captured image. At least one parameter of a projecting apparatus is configured according to the first configuration data.

In order to achieve one or a portion of or all of the objects or other objects, an embodiment of the disclosure provides a projecting apparatus including, but not limited to, an optical projection module, a memory, and a processor. The memory is used for storing program code. The processor is coupled to the memory. The processor is configured to execute the program code to perform: projecting, through the optical projection module, at least one first identification pattern, where the first identification pattern records a first configuration data of a target projecting apparatus; obtaining a captured image, where the first captured image captures the first identification pattern; identifying the first configuration data of the target projecting apparatus from the first captured image; configuring at least one parameter of the projecting apparatus according to the first configuration data.

Based on the above description, according to the configuration method for a projecting apparatus and the projecting apparatus of the embodiments of the disclosure, the identification pattern captured in the captured image can be used to obtain configuration data of the projecting apparatus. Therefore, the efficiency of configuration may be improved.

Other objectives, features and advantages of the present invention will be further understood from the further technological features disclosed by the embodiments of the present invention wherein there are shown and described preferred embodiments of this invention, simply by way of illustration of modes best suited to carry out the invention.

To make the aforementioned more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

It is to be understood that other embodiment may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

Figure 1A:
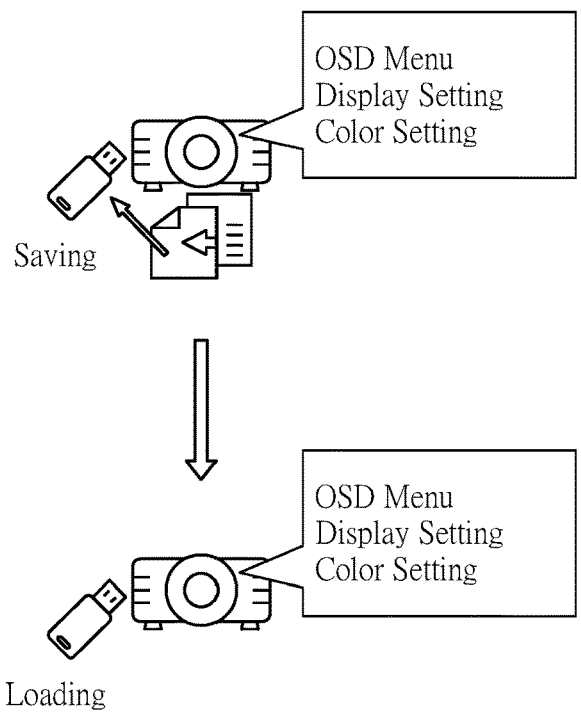
FIG. 1A to FIG. 1C are schematic diagrams of the existing configuring manners of a projector.
Figure 1B:
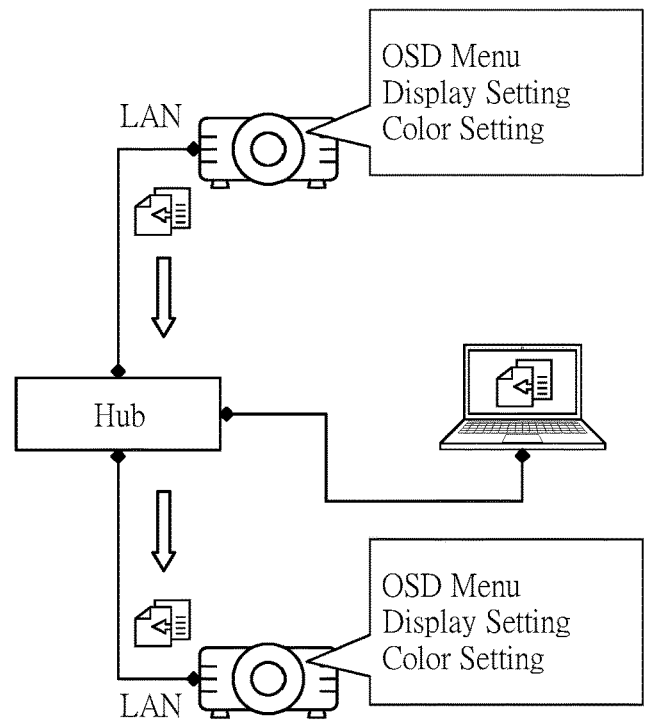
Figure 1C:
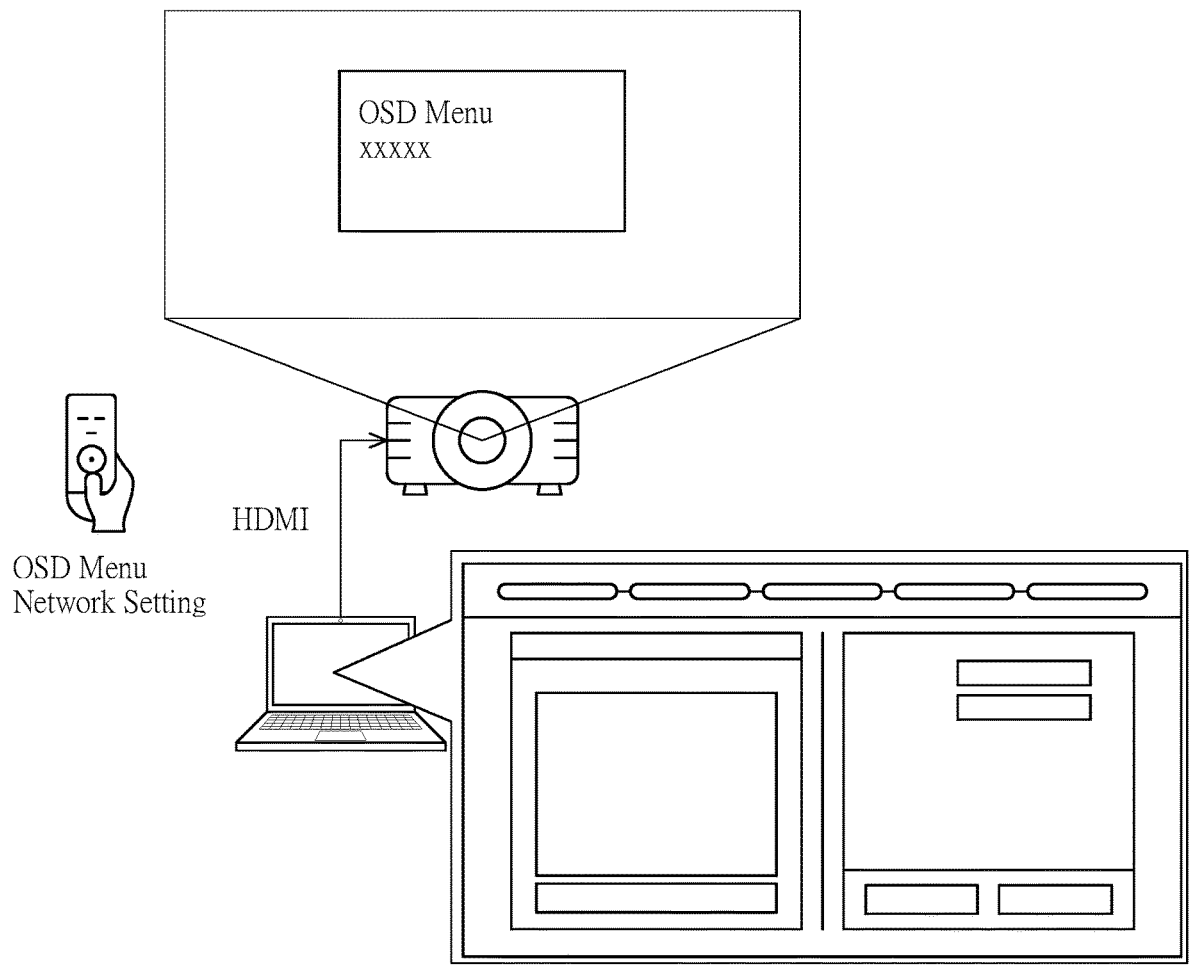
Figure 2:
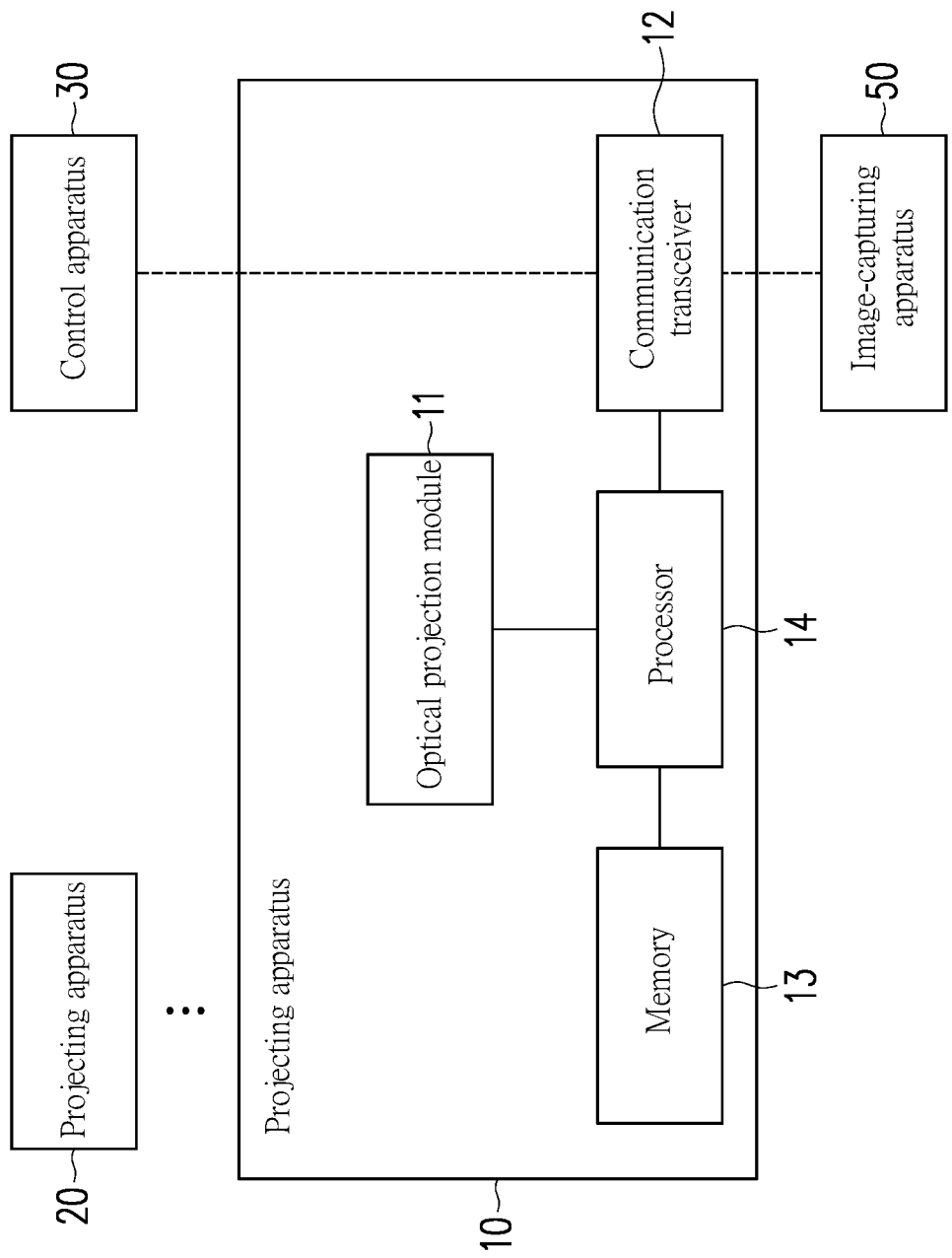
FIG. 2 is a block diagram of a system according to an embodiment of the disclosure.

FIG. 2 is a block diagram of system according to an embodiment of the disclosure. Referring to FIG. 2, the system 1 includes projecting apparatuses 10 and 20, one or more control apparatuses 30, and one or more image-capturing apparatuses 50.

The projecting apparatuses 10 and 20 may be a digital light processing (DLP) projector, a liquid crystal display (LCD) projector, or another projector with other projection display technologies.

The projecting apparatus 10 includes (but is not limited to) an optical projection module 11, a communication transceiver 12, a memory 14, and a processor 15.

The optical projection module 11 may include, but is not limited to, projection lens, a light source element (such as laser diode, LED, lamp, color filter, wavelength conversion element), a control circuit, and a light valve (such as liquid crystal display (LCD), or digital micro-mirror device (DMD)), or other projecting elements. In one embodiment, the optical projection module 11 is used for projecting an image and/or contents of on-screen display (OSD) menu.

The communication transceiver 12 may be a wireless transceiver that supports Wi-Fi, Bluetooth, infrared, fourth-generation (4G) or later-generation mobile communication, or other wireless communication techniques. Alternatively, the communication transceiver 12 may be a wired transceiver that supports USB, Ethernet, UART, or other wired communication techniques. Alternatively, the communication transceiver 12 may be a video transmission interface that supports HDMI, VGA, display port, or other video transmission techniques. In one embodiment, the communication transceiver 12 is used for receiving/transmitting data from/to another apparatus (such as the control apparatus 30 or the image-capturing apparatus 50).

The memory 13 may be a fixed or movable random access memory (RAM) in any types, a read-only memory (ROM), a flash memory, or a memory of a combination of similar elements or the foregoing elements. The memory 13 is used for storing buffered or permanent data, software modules, files (such as images, configuration data, configuration file, or contents of OSD), and the like, and detailed contents are explained in the following embodiments.

The processor 14 is coupled to the optical projection module 11, the communication transceiver 12, and the memory 13. The processor 14 may be a central processing unit (CPU), a microcontroller, a chip programmable controller, an application-specific integrated circuit (ASIC), a field programmable gate array (FPGA), or other similar components, or a combination of the above components.

The components and function of the projecting apparatus 20 could refer to the description of the projecting apparatus 10, and the detail thereof is not repeated. Furthermore, there may be more projecting apparatus 20 in the system 1.

The control apparatus 30 may be a handheld controller, a desktop computer, a notebook computer, an all-in-one (AIO) computer, a smartphone, a tablet computer, a wearable device, a smart assistance device, or a server.

The image-capturing apparatus 50 may be a monochrome camera, a color camera, a depth camera, a video camera, or other image-sensing devices capable of capturing images. In one embodiment, the image-capturing apparatus 50 is used for generates one or more captured images.

In the following description, the method of the embodiment of the disclosure is described with reference of various devices and components in the system 1. The process of the method may be adjusted according to an actual implementation situation, which is not limited by the disclosure.

Figure 3:
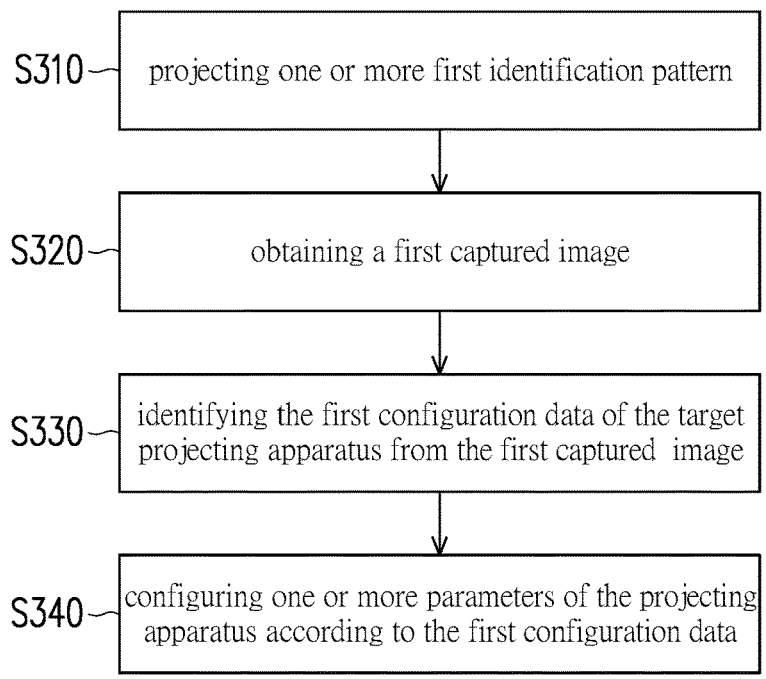
FIG. 3 is a flowchart of a configuration method for projecting apparatus according to an embodiment of the disclosure.

FIG. 3 is a flowchart of a configuration method for projecting apparatus 10 or 20 according to an embodiment of the disclosure. Referring to FIG. 3, the processor 14 of the projecting apparatus 10 projects one or more first identification patterns via the optical projection module 11 (step S310). Specifically, the optical projection module 11 projects image (called projected image hereinafter). The projected image includes one or more first identification patterns. In one embodiment, the first identification pattern is a QR code (quick response code). In another embodiment, the first identification pattern is another two-dimensional barcode such as Data Matrix, PDF417, MaxiCode, or Code 49. In still another embodiment, the first identification pattern may include text directly. The position or size of the first identification pattern in the projected image may be determined based on an actual requirement, for example, stitching multiple projecting images or environment.

The projected image and the first identification pattern may be generated by the control apparatus 30 or the processor 14. One or more first identification pattern record a first configuration data of a target projecting apparatus such as the projecting apparatus 10 or 20. In one embodiment, the first configuration data may be related to display mode, color mode, network address, and/or display group. The display mode may be, for example, front, ceiling, or rear front. The color mode may be, for example, bright, PC, or blending. The network address may be, for example, IP address, a gateway address, or a subnet mask. The display group may be, for example, a group name or a group identifier. However, there may be other settings of the projecting apparatus 10 or 20 that could be related to the first configuration data.

Figure 4:
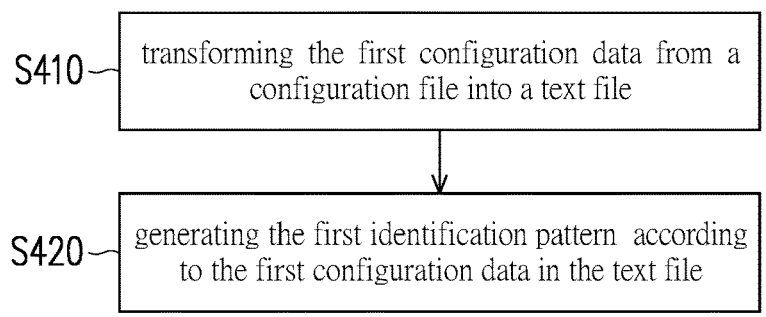
FIG. 4 is a flowchart of generating the first identification pattern according to an embodiment of the disclosure.

FIG. 4 is a flowchart of generating the first identification pattern according to an embodiment of the disclosure. Referring to FIG. 4, the processor 14 or the control apparatus 30 may transform the first configuration data from a configuration file into a text file (step S410). The configuration file may be, for example, INT file, CNF file, JSON file, or XML file. The text file may be, for example, TXT file.

Figure 5:
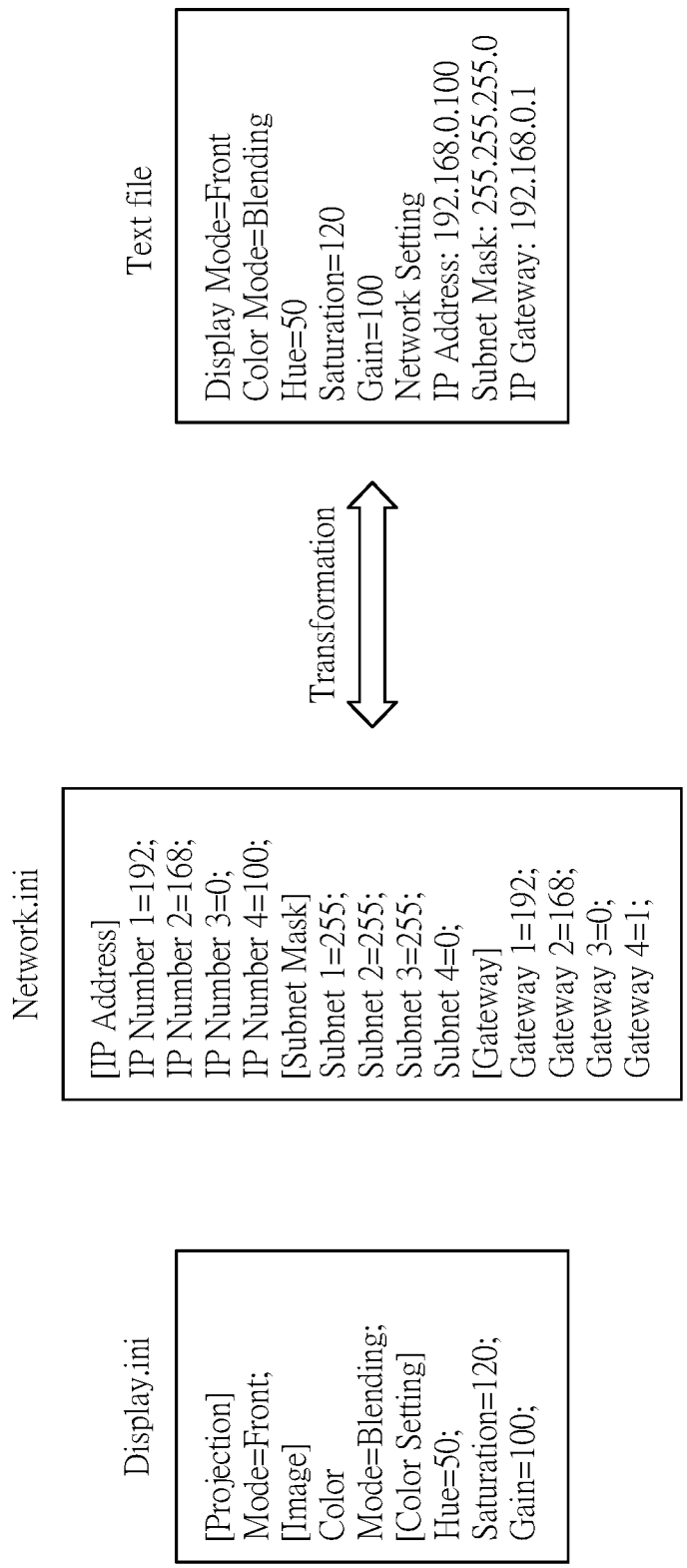
FIG. 5 is a schematic diagram illustrating a format transformation according to an embodiment of the disclosure.

For example, FIG. 5 is a schematic diagram illustrating a format transformation according to an embodiment of the disclosure. Referring to FIG. 5, the display and network configuration files (the configuration files) are transformed into a text file. The parameters in two configuration files may be integrated. Even multiple parameters in one configuration file could be transformed into a different representation form. For example, 'gateway 1=192', 'gateway 2=168', 'gateway 3=0', and 'gateway 4=1' in the configuration file are transformed into 'IP gateway: 192.168.0.1'. However, the embodiments of the disclosure do not limit the parameter content and transformation algorithm.

The processor 14 or the control apparatus 30 may generate one or more first identification patterns according to the first configuration data in the text file (step S420). Depending on the encoding mode of the first identification pattern, the processor 14 or the control apparatus 30 may encode the first identification pattern (text form) into a two-dimensional barcode. For example, the first configuration data is encoded by the control apparatus 30 or the processor 14 into a QR code, and the first identification pattern is the QR code.

In one embodiment, the control apparatus 30 uses a QR generator to generate one or more first identification patterns, and the processor 14 may receive the QR code through the communication transceiver 12. In another embodiment, the processor 14 may receive the parameter content of the first configuration data through the selection operation on the OSD menu, and the processor 14 may generate the QR code and project the QR code via the optical projection module 11.

Referring to FIG. 3, the processor 14 of the projecting apparatus 10 and/or 20 obtains a first captured image (S320). Specifically, the first captured image may be generated by the image-capturing apparatus 50 which takes a photo of the projected image projected by the projecting apparatus 10. The first captured image captures one or more first identification patterns.

Figure 6:
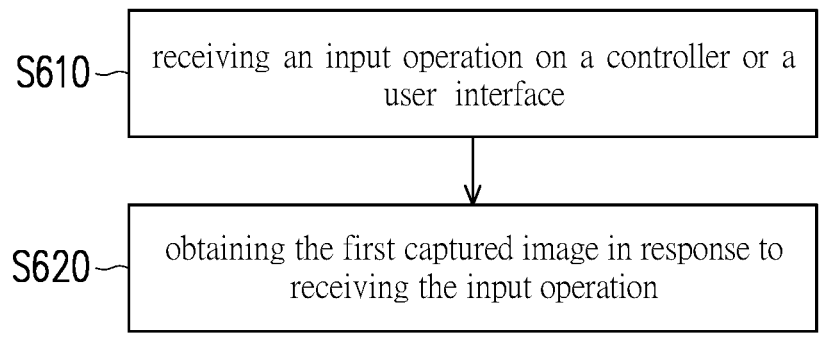
FIG. 6 is a flowchart illustrating the triggering of capturing an image according to an embodiment of the disclosure.

FIG. 6 is a flowchart illustrating the triggering of capturing an image according to an embodiment of the disclosure. Referring to FIG. 6, the processor 14 of the projecting apparatus 10 and/or 20 may receive an input operation on a controller or a user interface (step S610). The controller may a handheld controller (i.e., the control apparatus 30) of the projecting apparatus 10 and/or 20. The user interface may be the OSD menu projected by the projecting apparatus 10 and/or 20, the web-based page, or the interface of an application running on the control apparatus 30. The input operation may be, for example, pressing a photograph button on the controller or selecting a virtual button of the OSD menu related to taking a photo such as 'clone QR code: ON'.

The processor 14 of the projecting apparatus 10 and/or 20 may obtain the first captured image via the communication transceiver 12 in response to receiving the input operation (step S620). For example, the projecting apparatus 10 or the control apparatus 30 transmits an image request to the image-capturing apparatus 50, and the image-capturing apparatus 50 transmits the first captured image. In one embodiment, the input operation may further trigger step S310.

Referring to FIG. 3, the processor 14 of the projecting apparatus 10 and/or 20 identifies the first configuration data of the target projecting apparatus such as the projecting apparatus 10 or 20 from the first captured image (step S330). In one embodiment, depending on the encoding mode of the first identification pattern, the processor 14 may decode the first identification pattern in the first captured image, to obtain the first configuration data. For example, the first configuration data is encoded into a QRcode and the at least one first identification pattern is the QRcode. The processor 14 may decode the QR code, to obtain the first configuration data.

Furthermore, the processor 14 configures one or more parameters of the projecting apparatus 10 or 20 according to the first configuration data (step 340). Specifically, the parameter may be the parameter of display mode, color mode, network address, and/or group indicated in the first configuration data. The projecting apparatus 10 or 20 may obtain one or more parameters from the first configuration data and apply one or more parameters in the first configuration data.

Figure 7:
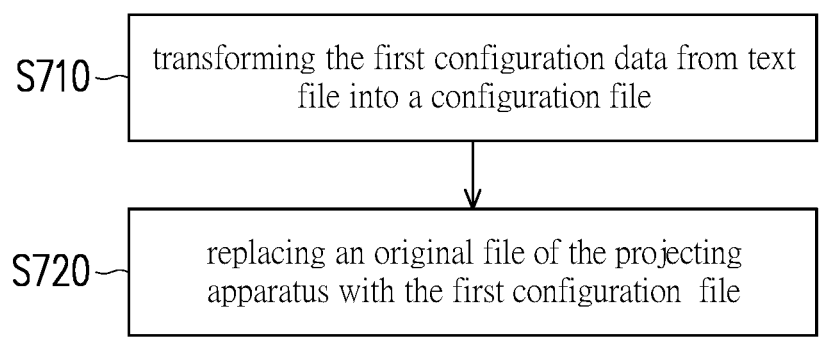
FIG. 7 is a flowchart illustrating the copying of a configuration file according to an embodiment of the disclosure.

In detail, FIG. 7 is a flowchart illustrating the copying of a configuration file according to an embodiment of the disclosure. Referring to FIG. 7, the processor 14 may transform the first configuration data from a text file into a configuration file (S710). The transformation between the text file and the configuration file could refer to the aforementioned description in step 310, and the detail thereof is not repeated. Taking FIG. 5 as an example, 'IP gateway: 192.168.0.1' in the text form is transformed into 'gateway 1=192', 'gateway 2=168', 'gateway 3=0', and 'gateway 4=1'.

If the first configuration data is a configuration file, the processor 14 of the projecting apparatus 10 and/or 20 may replace an original file of the projecting apparatus 10 and/or 20 with the configuration file (S720).

Figure 8:
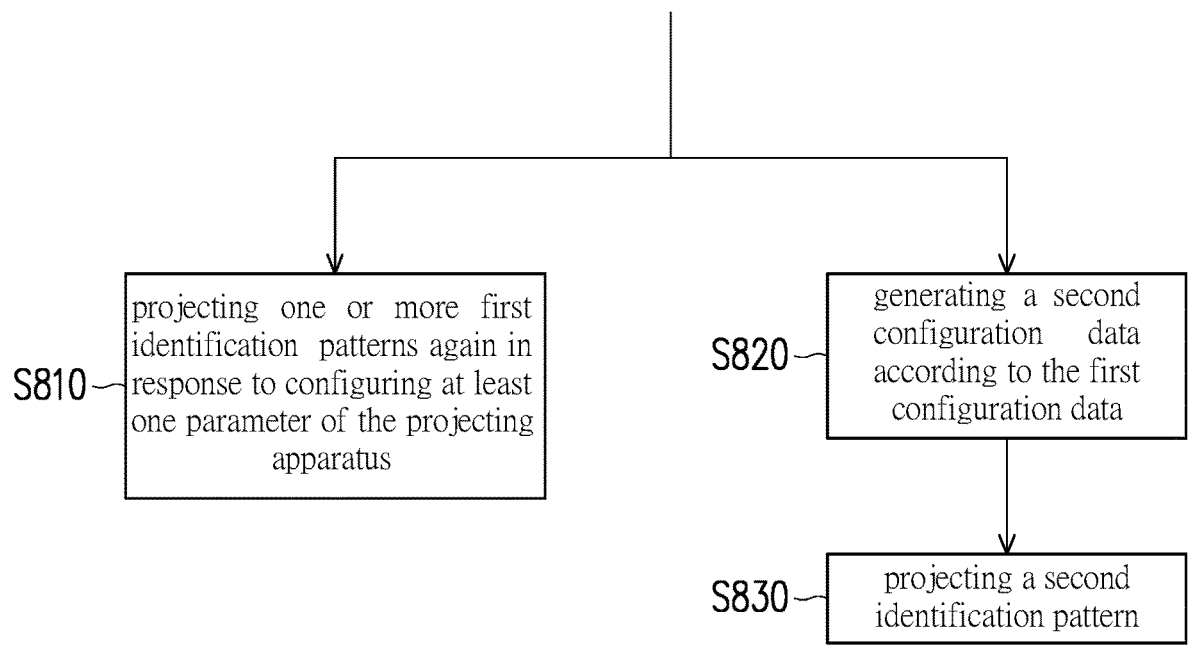
FIG. 8 is a flowchart illustrating the projection of an identification pattern according to an embodiment of the disclosure.

In some implementing scenarios, there may be more projecting apparatus 20 needed to be configured. FIG. 8 is a flowchart illustrating the projection of an identification pattern according to an embodiment of the disclosure. Referring to FIG. 8, if another projecting apparatus 20 would use the same first configuration data, the processor 14 or the control apparatus 30 may project one or more first identification patterns again (step S810) in response to configuring one or more parameters of the projecting apparatus 10 at step S340 and the first identification pattern being captured by another projecting apparatus 20. The another projecting apparatus 20 may perform steps S320 to S340, to apply the same parameters. However, when the projecting apparatus 10 projects one or more first identification patterns, the projecting apparatuses 10 and 20 may perform steps S320 to S340 at the same time, to apply the same parameters.

In one embodiment, the processor 14 or the control apparatus 30 may generate a second configuration data according to the first configuration data (step S820). One or more parameters in the second configuration data may be different from the parameters of the first configuration data.

For example, in one embodiment, the processor 14 or the control apparatus 30 may generate a network address in the second configuration data different from another network address of the first configuration data. For example, the IP address of multiple projecting apparatuses 10 and 20 can not be the same in the same network.

In one embodiment, the processor 14 or the control apparatus 30 may generate an address list recorded in the second configuration data. The address list includes a network address of the projecting apparatus 10 based on the first configuration data. Once the projecting apparatus 10 applies the network address, the projecting apparatus 10 adds its network address to the address list, so that the projecting apparatus 20 may know which network address has been applied.

In one embodiment, the second configuration data include a location of the projected image of the projecting apparatus 20 (i.e., another projecting apparatus) for stitching different from a location indicated in the first configuration data. Regarding stitching multiple projected images, the locations of these projected images should be arranged, and the locations of these projected images are different.

Similarly, the second configuration data may be transformed from a configuration file into a text file. Alternatively, the second configuration data may be generated in text file directly.

Referring to FIG. 8, the processor 14 may project one or more second identification patterns through the optical projection module 11 (step S830). The second identification pattern records the second configuration data, and the second configuration data is used by another projecting apparatus such as the projecting apparatus 20. The introduction of the second identification pattern could refer to the aforementioned description of the first identification pattern, and the detail thereof is not repeated. The projecting apparatus 20 may perform steps S320 to S340, to apply the parameters indicated in the second configuration data.

Figure 9A:
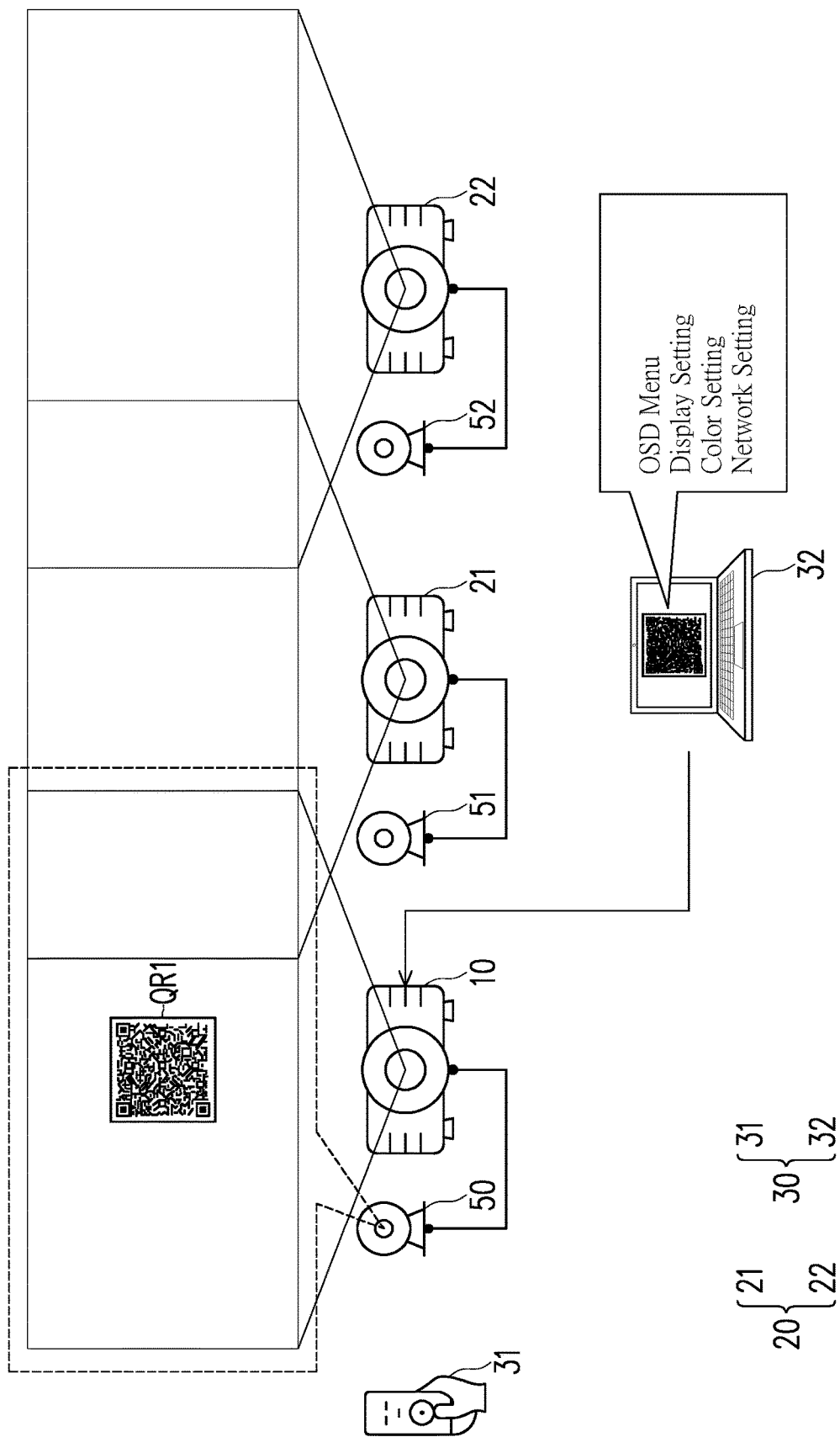
FIG. 9A to FIG. 9D are schematic diagrams illustrating configuring projecting apparatuses according to an embodiment of the disclosure.

FIG. 9A to FIG. 9D are schematic diagrams illustrating configuring projecting apparatuses according to an embodiment of the disclosure. Referring to FIG. 9A, the 30 includes a handheld controller 31 and a computer 32, The projecting apparatus 20 includes projecting apparatus 21 and projecting apparatus 22. The computer 32 is connected to the projecting apparatus 10 via HDMI. The image-capturing apparatus 50 is connected to the projecting apparatus 10, the image-capturing apparatus 51 is connected to the projecting apparatus 21, and the image-capturing apparatus 52 is connected to the projecting apparatus 22. That is, the image-capturing apparatus and the projecting apparatus is a one-to-one relationship. A QR code QR1 generated by the computer 32 is projected by the projecting apparatus 10. A handheld controller 31 of the projecting apparatus 10 receives an input operation related to cloning the QR code. The projecting apparatus 10 obtains the QR code QR1 captured by the image-capturing apparatus 50. The projecting apparatus 10 analyses the QR code QR1 and applies the parameters indicated in the QR code QR1.

Figure 9B:
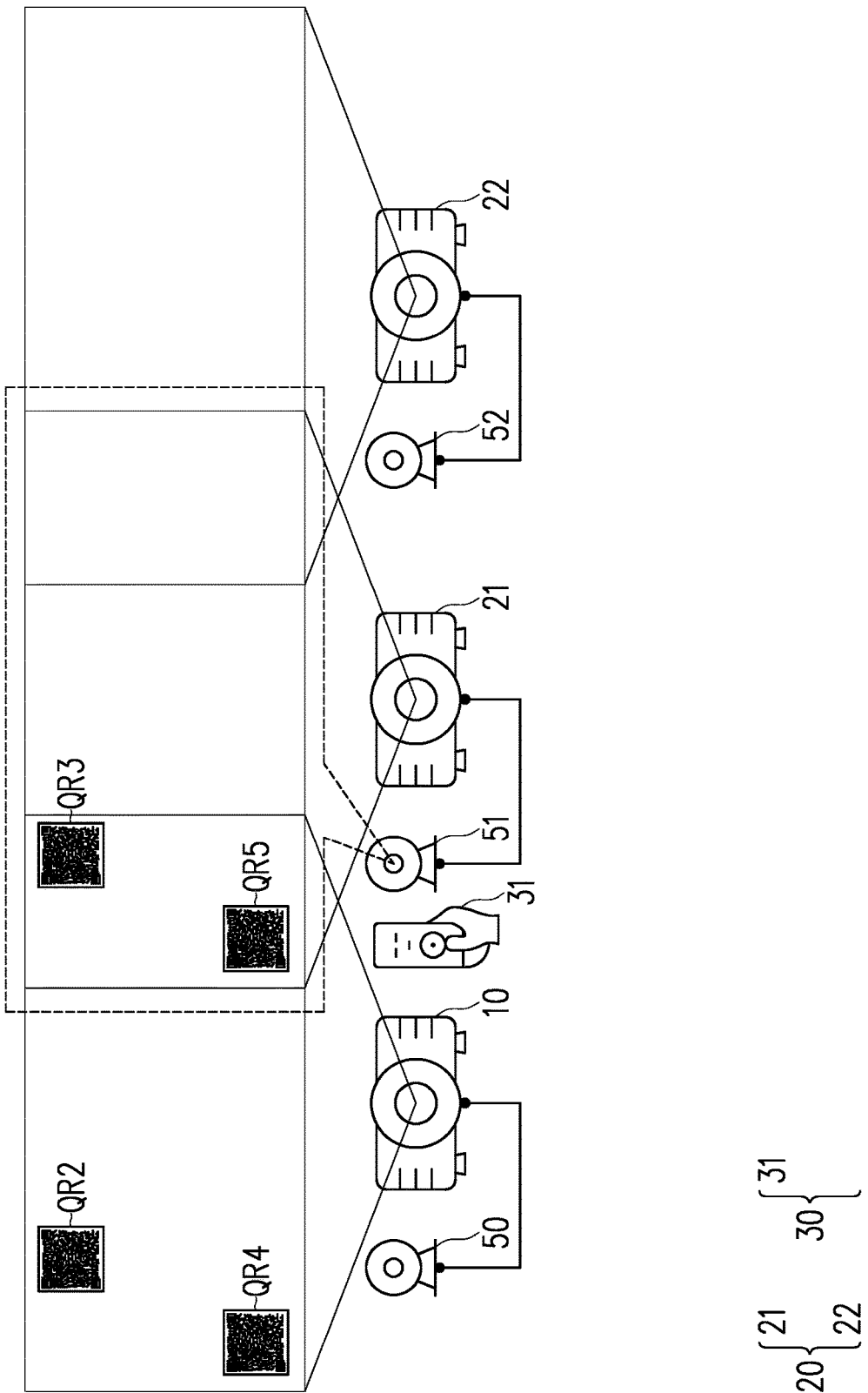

Referring to FIG. 9B, the projecting apparatus 10 projects four QR codes QR2, QR3, QR4, and QR5. These QR codes QR1-QR5 may be the same. A handheld controller 31 of the projecting apparatus 21 receives an input operation related to cloning the QR code. The projecting apparatus 21 obtains the QR codes QR3 and QR5 captured by the image-capturing apparatus 51. The projecting apparatus 21 analyses the QR codes QR3 and QR5 and applies the parameters indicated in the QR codes QR3 and QR5.

Figure 9C:
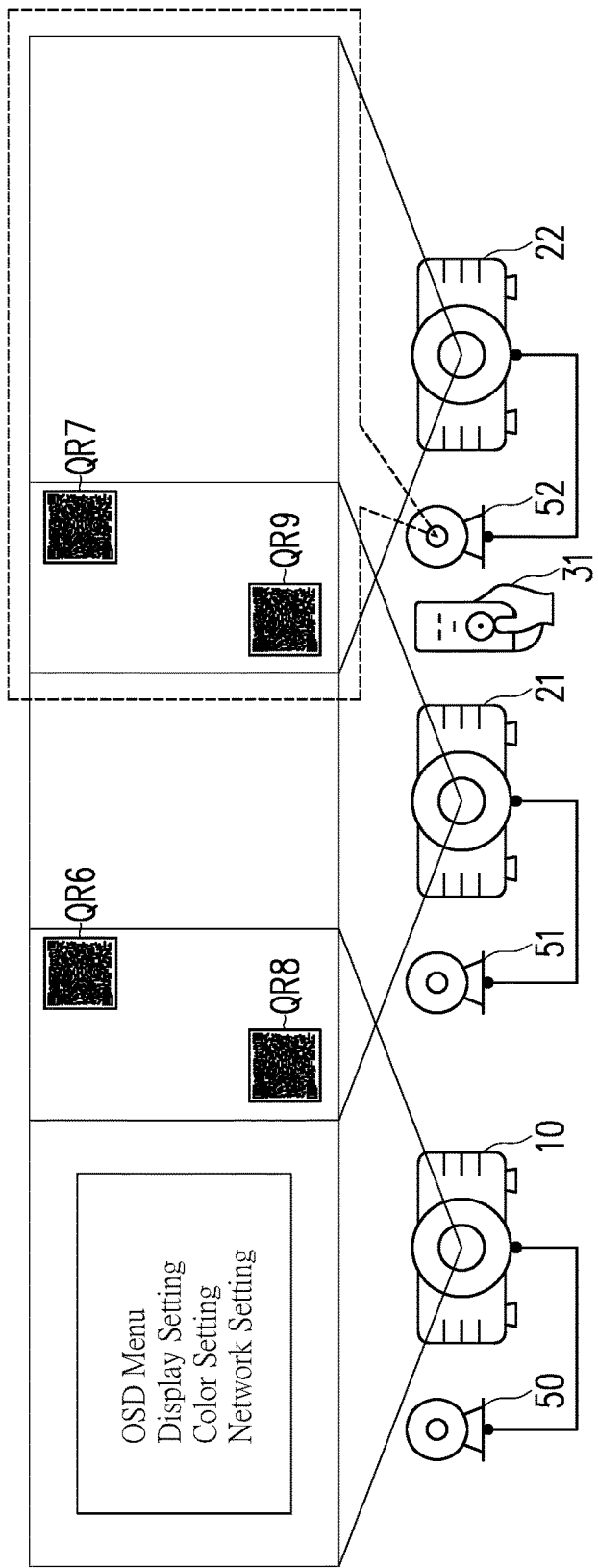

Referring to FIG. 9C, the projecting apparatus 21 projects four QR codes QR6, QR7, QR8, and QR9. These QR codes QR1-QR9 may be the same. A handheld controller 31 of the projecting apparatus 22 receives an input operation related to cloning the QR code. The projecting apparatus 22 obtains the QR codes QR7 and QR9 captured by the image-capturing apparatus 52. The projecting apparatus 22 analyses the QR codes QR7 and QR9 and applies the parameters indicated in the QR codes QR7 and QR9.

Figure 9D:
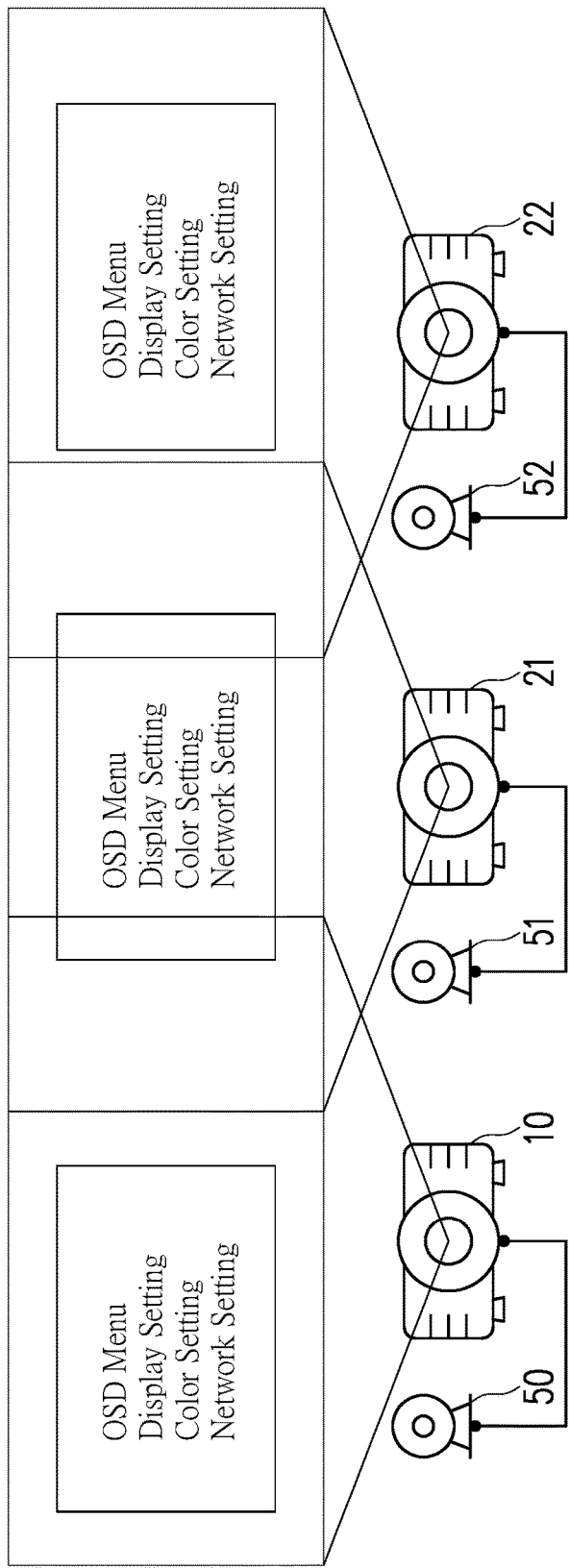

Referring to FIG. 9D, these projecting apparatuses 10, 21, and 22 would apply the same parameters, so as to complete the cloning of the parameters.

Figure 10A:
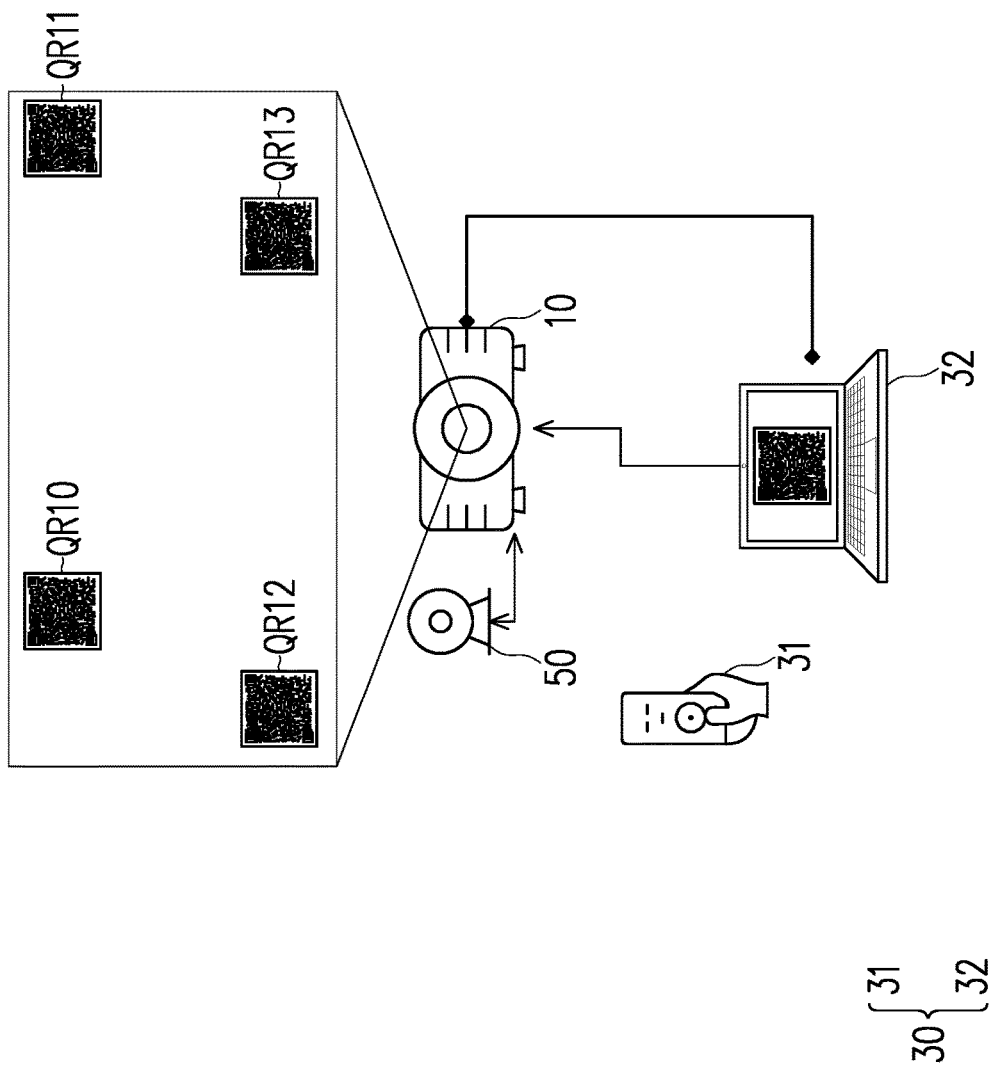
FIG. 10A is a schematic diagram illustrating configuring single projecting apparatus with a network configuration according to an embodiment of the disclosure.

One of the objectives of the embodiments of the disclosure is that the parameters could be applied by the projecting apparatus 10 or 20 according to a captured image generated by the image-capturing apparatus 50 before some initial settings such as IP address are configured. The network setting can be cloned, and the IP address can not be duplicated on two projecting apparatus 10 and 20. For example, FIG. 10A is a schematic diagram illustrating configuring single projecting apparatus with a network configuration according to an embodiment of the disclosure. Referring to FIG. 10A, the projecting apparatus 10 is connected to the computer 32 via the video transmission interface such as HDMI, VGA, or display port. The computer 32 generates a QR code corresponding to a set of parameters in which one parameter is the IP address. The QR code is transmitted via the video transmission interface and projected by the projecting apparatus 10. For example, the projecting apparatus 10 projects four QR codes QR10, QR11, QR12, and QR13. The image-capturing apparatus 50 captures the QR codes QR10-QR13. The projecting apparatus 10 analyses the QR codes QR10-QR13, to obtain and apply the parameters indicated in the QR codes QR10-QR13. And then, the parameters could be transmitted to the computer 32, so that the parameter related to the IP address could be selected or the connection could be established with the IP address automatically. Alternatively, the projecting apparatus 10 may project the IP address. Therefore, the IP address could be configured manually.

It should be noticed that there is no limitation that the QR code is provided by the computer or another control apparatus 30, the QR code is provided by the projecting apparatus 10. In other words, there is no need for the projecting apparatus 10 to connect to the computer 32 or another control apparatus 30.

Figure 10B:
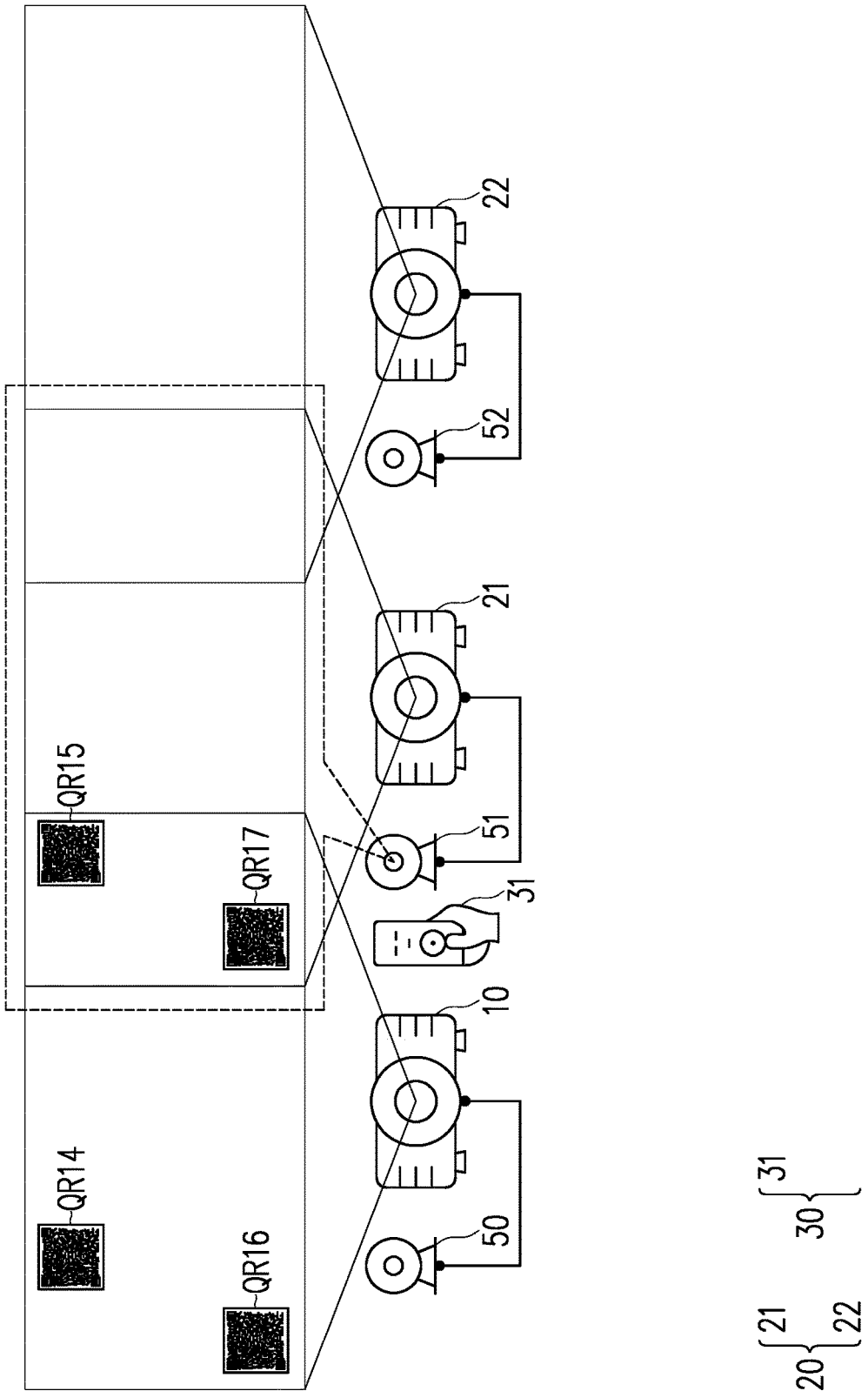
FIG. 10B to FIG. 10D are schematic diagrams illustrating configuring multiple projecting apparatuses with multiple network configurations according to an embodiment of the disclosure.
Figure 10C:
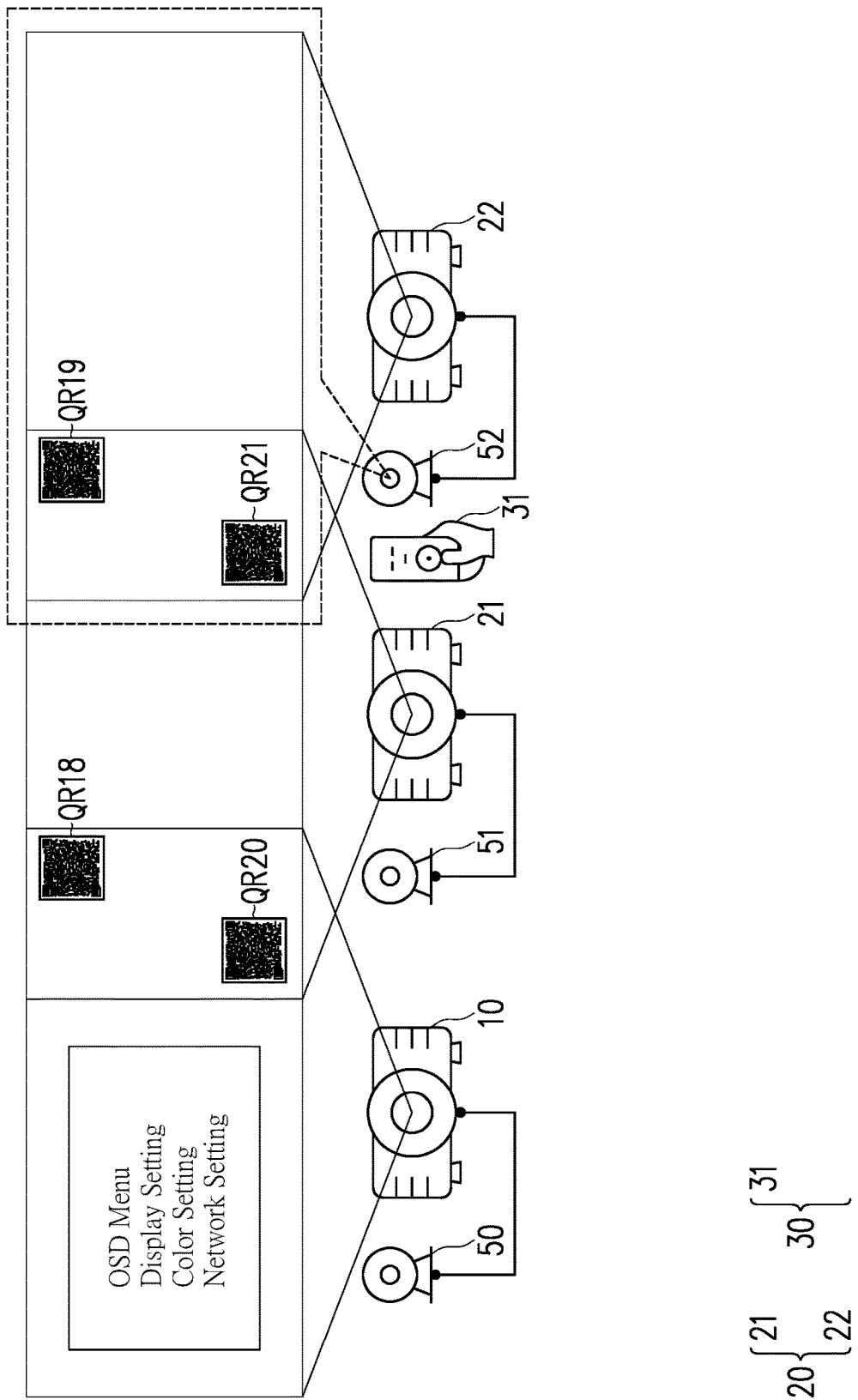
Figure 10D:
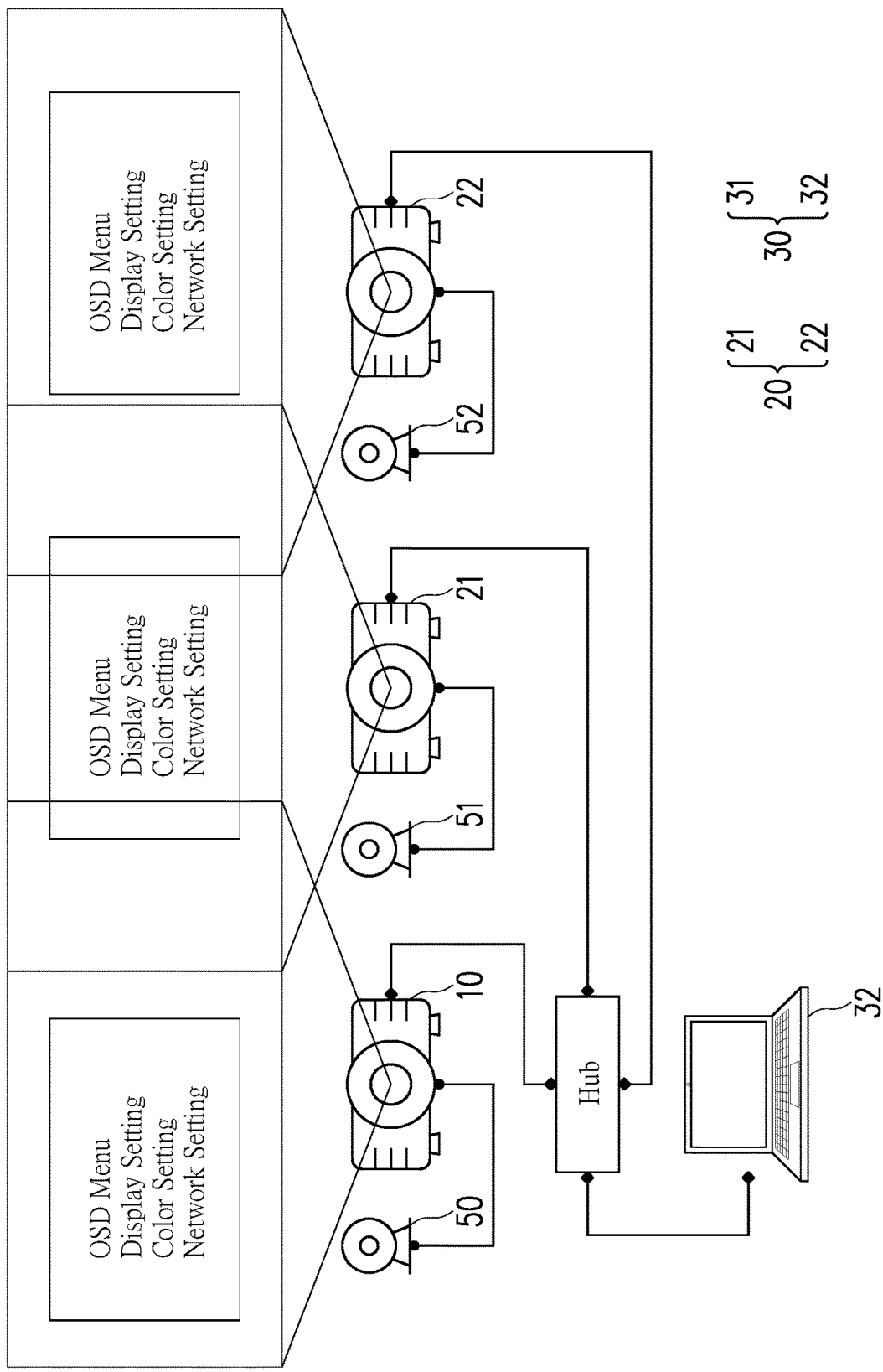

FIG. 10B to FIG. 10D are schematic diagrams illustrating configuring multiple projecting apparatuses with multiple network configurations according to an embodiment of the disclosure. Referring to FIG. 10B, taking the stitching scenario as an example, the triggering of projecting and obtaining identification patterns such as QR codes may be an input operation on the handheld controller 31 or the OSD menu. The control apparatus 30 or the projecting apparatus 10 generates a QR code corresponding to a set of parameters in which one parameter is the IP address. The projecting apparatus 10 projects four QR codes QR14, QR15, QR16, and QR17. These QR codes QR14-QR17 may be located at the four corners of the projected image, so that the image-capturing apparatus 51 captures the QR codes QR15 and QR17. The projecting apparatus 21 analyses the QR codes QR15 and QR17, to obtain the parameters indicated in the QR codes QR15 and QR17. However, the projecting apparatus 21 does not use the IP address indicated in the QR codes QR15 and QR17. The projecting apparatus 21 generates its IP address according to an address list recording the IP address of the projecting apparatus 10. For example, if '192.168.0.100' is configured in the address list, the IP address of the projecting apparatus 21 could be '192.168.0.101' based on the order of the address list. Then, '192.168.0.101' would be added to the address list.

Referring to FIG. 10C, the projecting apparatus 21 generates and projects four QR codes QR18, QR19, QR20, and QR21. These QR codes QR18-QR21 are generated based on IP address '192.168.0.101' and the address list recording '192.168.0.101'. These QR codes QR18-QR21 may be located at the four corners of the projected image, so that the image-capturing apparatus 52 captures the QR codes QR19 and QR21. The projecting apparatus 22 analyses the QR codes QR19 and QR21, to obtain the parameters indicated in the QR codes QR19 and QR21. However, the projecting apparatus 22 does not use the IP address indicated in the QR codes QR19 and QR21. The projecting apparatus 22 generates its IP address according to an address list recording the IP address of the projecting apparatuses 10 and 21. For example, if '192.168.0.101' is configured in the address list, the IP address of the projecting apparatus 22 could be '192.168.0.102' based on the order of the address list. Then, '192.168.0.102' would be added to the address list. If there are more projecting apparatuses 20, their IP addresses could be generated based on the aforementioned manner.

It should be noticed that the IP addresses would not be duplicated by incrementing the number by 1. Therefore, the location of the projecting apparatuses 10 and 20 or their projected images would be known, and these projecting apparatuses 10 and 20 could be grouped for further implementation.

Furthermore, the projecting apparatuses 10 and 20 in the same group may be configured with the same group information such as 'group A' by the configuration method of the embodiments of the disclosure, so as to achieve grouping of multiple projecting apparatuses.

In summary, according to the projecting method for projecting apparatus and the projecting apparatus, the identification pattern generated based on the configuration data may be captured and analyzed, the configuration data may be obtained from the identification pattern, and the parameters indicated in the configuration data may be applied on the projecting apparatus. Therefore, the parameters including network and display configurations could be cloned by projecting and capturing identification patterns.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A configuration method for projecting apparatus, comprising steps of:
   projecting, by a target projecting apparatus, at least one first identification pattern, wherein the at least one first identification pattern records a first configuration data of the target projecting apparatus, and the first configuration data is related to at least one of display mode, color mode and display group;
   obtaining, by a projecting apparatus, a first captured image, wherein the first captured image captures the at least one first identification pattern;
   identifying, by the projecting apparatus, the first configuration data of the target projecting apparatus from the first captured image; and
   configuring at least one parameter on the projecting apparatus according to the first configuration data, wherein the at least one parameter on the projecting apparatus is same as at least one parameter of the at least one of the display mode, the color mode, and the display group indicated in the first configuration data of the target projecting apparatus.

2. The configuration method according to claim 1, wherein the step of identifying the first configuration data of the target projecting apparatus comprises:
   transforming the first configuration data from a text file into a configuration file, and
   configuring the at least one parameter of the projecting apparatus comprises:
   replacing an original file of the projecting apparatus with the configuration file.

3. The configuration method according to claim 1, wherein the first configuration data is encoded into a QRcode and the at least one first identification pattern is the QRcode, and the step of identifying the first configuration data of the target projecting apparatus comprises:
   decoding the QR code, to obtain the first configuration data.

4. The configuration method according to claim 1, further comprising a step of:
   projecting the at least one first identification image again in response to configuring at least one parameter of the projecting apparatus, and the at least one first identification pattern being captured by another projecting apparatus.

5. The configuration method according to claim 1, further comprising steps of:
   generating a second configuration data according to the first configuration data; and
   projecting at least one second identification pattern, wherein the at least one second identification pattern records the second configuration data, and the second configuration data is used by another projecting apparatus.

6. The configuration method according to claim 5, wherein the step of generating the second configuration data comprises:
   generating a network address recorded in the second configuration data different from another network address of the first configuration data.

7. The configuration method according to claim 5, wherein the step of generating the second configuration data comprises:
   generating an address list recorded in the second configuration data, wherein the address list comprises a network address of the projecting apparatus based on the first configuration data.

8. A configuration method for projecting apparatus, comprising steps of:
projecting, by a target projecting apparatus, at least one first identification pattern, wherein the at least one first identification pattern records a first configuration data of the target projecting apparatus;
obtaining, by a projecting apparatus, a first captured image, wherein the first captured image captures the at least one first identification pattern;
identifying, by the projecting apparatus, the first configuration data of the target projecting apparatus from the first captured image;
configuring at least one parameter on the projecting apparatus according to the first configuration data;
generating a second configuration data according to the first configuration data, wherein the second configuration data comprises a location of a projected image of another projecting apparatus for stitching different from a location indicated in the first configuration data.

9. The configuration method according to claim 1, further comprising steps of:
transforming the first configuration data from a configuration file into a text file; and
generating the at least one first identification pattern according to the first configuration data in the text file.

10. The configuration method according to claim 1, wherein the step of obtaining a first captured image comprises:
receiving an input operation on a controller or a user interface; and
obtaining the first captured image in response to receiving the input operation.

11. A projecting apparatus, comprising:
an optical projection module;
a memory, used for storing program code; and
a processor, coupled to the memory, and configured to execute the program code to perform:
projecting, through the optical projection module, at least one first identification pattern, wherein the at least one first identification pattern records a first configuration data of a target projecting apparatus, and the first configuration data is related to at least one of display mode, color mode and display group;
obtaining a captured image, wherein the first captured image captures the at least one first identification pattern;
identifying the first configuration data of the target projecting apparatus from the first captured image; and
configuring at least one parameter on the projecting apparatus according to the first configuration data, wherein the at least one parameter on the projecting apparatus is same as at least one parameter of the at least one of the display mode, the color mode and the display group indicated in the first configuration data of the target projecting apparatus.

12. The projecting apparatus according to claim 11, wherein the processor further performs:
transforming the first configuration data from a text file into a configuration file; and
replacing an original file of the projecting apparatus with the configuration file.

13. The projecting apparatus according to claim 11, wherein the first configuration data is encoded into a QRcode and the at least one first identification pattern is the QRcode, and the processor further performs:
decoding the QRcode, to obtain the first configuration data.

14. The projecting apparatus according to claim 11, wherein the processor further performs:
projecting, through the optical projection module, the at least one first identification pattern in response to configuring at least one parameter of the projecting apparatus, and the at least one first identification pattern being captured by another projecting apparatus.

15. The projecting apparatus according to claim 11, wherein the processor further performs:
generating a second configuration data according to the first configuration data; and
projecting, through the optical projection module, at least one second identification pattern, wherein the at least one second identification pattern records the second configuration data, and the second configuration data is used by another projecting apparatus.

16. The projecting apparatus according to claim 15, wherein the processor further performs:
generating a network address recorded in the second configuration data different from another network address of the first configuration data.

17. The projecting apparatus according to claim 15, wherein the processor further performs:
generating an address list recorded in the second configuration data, wherein the address list comprises a network address of the projecting apparatus based on the first configuration data.

18. A projecting apparatus, comprising:
an optical projection module;
a memory, used for storing program code; and
a processor, coupled to the memory, and configured to execute the program code to perform:
projecting, through the optical projection module, at least one first identification pattern, wherein the at least one first identification pattern records a first configuration data of a target projecting apparatus;
obtaining a captured image, wherein the first captured image captures the at least one first identification pattern;
identifying the first configuration data of the target projecting apparatus from the first captured image;
configuring at least one parameter on the projecting apparatus according to the first configuration data; and
generating a second configuration data according to the first configuration data, wherein the second configuration data comprises a location of a projected image of another projecting apparatus for stitching different from a location indicated in the first configuration data.

19. The projecting apparatus according to claim 11, wherein the processor further performs:
transforming the first configuration data from a configuration file into a text file; and
generating the at least first identification pattern according to the first configuration data in the text file.

20. The projecting apparatus according to claim 11, wherein the processor further performs:
receiving an input operation on a controller or a user interface; and
obtaining the first captured image in response to receiving the input operation.

* * * * *